United States Patent
Strack et al.

(10) Patent No.: US 8,523,002 B2
(45) Date of Patent: Sep. 3, 2013

(54) EMBEDDED REINFORCEMENT SLEEVE FOR A PRESSURE VESSEL

(75) Inventors: Ludger Strack, Heidenrod (DE); Markus Lindner, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 462 days.

(21) Appl. No.: 12/713,756

(22) Filed: Feb. 26, 2010

(65) Prior Publication Data

US 2011/0210128 A1   Sep. 1, 2011

(51) Int. Cl.
    *F17C 1/08* (2006.01)

(52) U.S. Cl.
    USPC ............................................ 220/592; 29/469

(58) Field of Classification Search
    USPC .............. 220/592, 586, 582, 581, 325, 293, 220/643, 640, 639, 644, 645, 601; 206/0.6; 277/634; 29/469
    IPC ........................... F17C 1/08, 1/02; B65D 45/16
    See application file for complete search history.

(56) References Cited

U.S. PATENT DOCUMENTS

| | | | | |
|---|---|---|---|---|
| 1,904,250 A | * | 4/1933 | Purvis | 220/240 |
| 2,365,178 A | * | 12/1944 | Dodson | 220/214 |
| 2,644,313 A | * | 7/1953 | Griggs | 206/0.6 |
| 3,159,306 A | * | 12/1964 | Lyall | 220/565 |
| 4,685,589 A | * | 8/1987 | Benton | 220/661 |
| 5,518,141 A | * | 5/1996 | Newhouse et al. | 220/586 |
| 5,839,600 A | * | 11/1998 | Moreira et al. | 220/560.04 |
| 6,186,356 B1 | * | 2/2001 | Berkley et al. | 220/582 |
| 7,032,767 B2 | | 4/2006 | Funck | |
| 2003/0089723 A1 | * | 5/2003 | Funck | 220/581 |
| 2004/0188449 A1 | * | 9/2004 | Thompson | 220/723 |
| 2009/0071965 A1 | * | 3/2009 | Iida et al. | 220/586 |
| 2009/0200757 A1 | * | 8/2009 | Lindner | 277/650 |
| 2009/0255940 A1 | * | 10/2009 | Murate et al. | 220/592 |

FOREIGN PATENT DOCUMENTS

| | | |
|---|---|---|
| DE | 195 26 154 | 1/1997 |
| WO | WO 99/13263 | 3/1999 |
| WO | WO 99/39896 | 8/1999 |
| WO | WO 2007/079971 | 7/2007 |

* cited by examiner

*Primary Examiner* — Robert J Hicks
(74) *Attorney, Agent, or Firm* — Fraser Clemens Martin & Miller LLC; J. Douglas Miller

(57) ABSTRACT

A boss system for a pressure vessel includes a boss and a capture sleeve. The capture sleeve is substantially embedded within a liner of the pressure vessel adjacent a vessel opening. The capture sleeve is provided with a plurality of attachment members configured to cooperate with the boss to secure the boss to the liner of the pressure vessel. The boss system minimizes the effects of pressure and temperature variations during use of the pressure vessel, militates against an axial and rotational movement of the boss, and facilitates installation and replacement of a seal disposed adjacent the boss.

19 Claims, 5 Drawing Sheets

EMBEDDED REINFORCEMENT SLEEVE FOR A PRESSURE VESSEL

FIELD OF THE INVENTION

The invention relates to pressure vessels, and more particularly to a boss and a capture sleeve for a pressure vessel and a method for producing a pressure vessel including the boss and the capture sleeve.

BACKGROUND OF THE INVENTION

A pressure vessel for storing high pressure gaseous mediums (such as hydrogen, compressed natural gas, or air) typically include an inner plastic liner, at least one mouthpiece (metal boss), and a wound outer shell to support the pressure vessel. The pressure vessel may be incorporated into a vehicle to supply hydrogen to a proton exchange membrane (PEM) fuel cell stack capable of powering the vehicle, for example. Hydrogen stored within the vessel may be pressurized to at least 70 MPa to accommodate a travel range of the vehicle consistent with consumer needs. Accordingly, adequate sealing between the inner plastic liner and the at least one boss is necessary to militate against loss of the gaseous medium.

The inner plastic liner may be produced by any conventional process such as rotational molding, blow molding, injection molding, or thermoforming. As examples, the following patents disclose pressure vessels including an inner liner (WO 1999/039896; WO 2007/079971; DE 19526154; and WO 1999/013263), each of which is incorporated herein by reference in its entirety.

The gaseous medium passes through the boss when one of entering and exiting the pressure vessel. The boss is typically configured with one of threads or other coupling means to accept a valve, a sensor, a coupler, a conduit, or other device. Accordingly, the boss provides a reliable and versatile coupling point for the pressure vessel.

Sealing elements such as a compression fitting and O-rings may be disposed between the boss and the inner plastic lining to militate against an unintended loss of the gaseous medium. Multi-piece boss designs, a plurality of sealing elements, or compression of the lining by the boss may be used to form a seal between the inner plastic lining and the boss.

U.S. Pat. No. 7,032,767 discloses a multi-piece boss design for a pressure vessel including an inner plastic lining, wherein a seal is disposed between the boss and the lining. In addition to requiring a complicated assembly procedure, the multi-piece boss design does not accommodate fluctuating forces exerted on the seal caused by repeated thermal cycles and pressure cycles. For example, a high pressure and temperature of the fluid within the pressure vessel causes the inner plastic lining to increase in size to an expanded state, increasing a force exerted by the seal on the boss and the liner. Conversely, a low pressure and temperature of the fluid within the pressure vessel causes the inner plastic lining to retract in size from the expanded state, decreasing a force exerted by the seal on the boss and the liner.

Movement of the boss with respect to the inner plastic lining in the pressure vessel is an undesirable effect that may occur during one of assembly and use of the pressure vessel. Particularly, one of an axial and a rotational movement of the boss may cause a fluctuation of the forces exerted on the seal. The axial movement of the boss may permit one of the boss and a boss component to fall inside the pressure vessel or separate from the pressure vessel. Further, the axial movement of the boss may separate the seal from contact with one of the boss and the lining. The rotational movement of the boss may permit one of the boss and the boss component to disengage from a fastening means and exert a localized force on at least a portion of the seal.

The seal disposed between the boss and the lining may be improperly positioned due to an inability to visually confirm a proper placement of the seal. The seal incorporated in the multi-piece boss may not be visible during the assembly of the pressure vessel. As a result, the seal may be improperly positioned or subject to an unintended force during the assembly. Additionally, the pressure vessel may include the boss that is permanently affixed to the lining by one of an adhesive and the wound outer shell. As a result, a service life of the seal may be shorter than a service life of the pressure vessel.

It would be desirable to develop a boss and a capture sleeve for use with a pressure vessel, wherein proper installation of a seal disposed between the boss and a lining of the pressure vessel is facilitated and the sleeve and the lining militate against movement of the boss, and wherein the boss facilitates installation and replacement of the seal.

SUMMARY OF THE INVENTION

Presently provided by the invention, a boss and a capture sleeve for use with a pressure vessel, wherein proper installation of a seal disposed between the boss and a lining of the pressure vessel is facilitated and the sleeve and the lining militate against movement of the boss, and wherein the boss facilitates installation and replacement of the seal, has surprisingly been discovered.

In one embodiment, a boss system for a vessel comprises a capture sleeve disposed within a liner of the vessel and adjacent a vessel opening, the capture sleeve including a hollow main body with a plurality of attachment members, and a boss disposed adjacent the vessel opening, the boss including a plurality of receiving elements formed therein adapted to receive the plurality of attachment members.

In another embodiment, a vessel for storing a fluid comprises a vessel liner having a vessel opening formed therein, a capture sleeve disposed within the vessel liner adjacent the vessel opening, the capture sleeve including a hollow main body with a plurality of attachment members disposed thereon, the capture sleeve militating against an outward expansion of the vessel liner, a boss disposed adjacent the vessel opening, the boss including an adapter portion releasably attached to an engagement portion, the engagement portion including a plurality of receiving elements formed therein adapted to receive the plurality of attachment members, the plurality of receiving elements and the plurality of attachment members cooperating to militate against relative movement between the boss and the capture sleeve, and a sealing element disposed between the adapter portion and the engagement portion, the sealing element exerting a substantially constant force on the vessel liner.

The invention also provides methods for forming a vessel including a boss.

One method comprises the steps of providing a capture sleeve including a hollow main body and a plurality of attachment members disposed thereon, providing a capture sleeve including a hollow main body and a plurality of attachment members disposed thereon, providing a boss including a plurality of receiving elements, the boss adapted to receive a utility device, forming a vessel liner having a vessel opening formed therein, the capture sleeve disposed within the vessel liner adjacent the vessel opening, disposing the boss adjacent the vessel opening, the plurality of attachment members received by the plurality of receiving elements, thereby securing the boss to the vessel liner, and providing a sealing element between the vessel opening and the boss.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
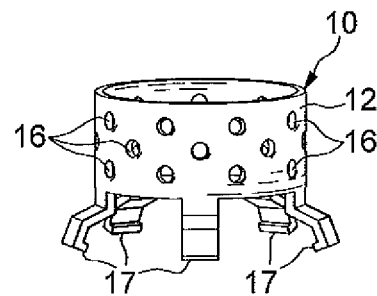
FIG. 1 is a perspective view of a capture sleeve according to an embodiment of the present invention.

FIG. 1 illustrates a capture sleeve 10 for use with a vessel according to an embodiment of the present invention. The capture sleeve 10 is typically formed from a metal such as a steel alloy, high carbon steel, stainless steel, nickel alloy, or aluminum alloy, but other materials such as plastics and composites may be used. The capture sleeve 10 includes a hollow main body 12. As illustrated, the hollow main body 12 is a hollow right circular cylinder, but other shapes may be used. A plurality of surface irregularities 16 is formed in the hollow main body 12. As shown, the surface irregularities 16 are circular apertures formed in a radial array of three rows on the hollow main body 12, but any arrangement and quantity of the surface irregularities 16 may be used. The surface irregularities 16 may be any other shape such as oval apertures, rectangular apertures, a plurality of ribs, or a knurled portion, for example. A plurality of attachment members 17 depend from a distal end of the main body 12 and is integrally formed with the main body 12. The attachment members 17 shown are formed from a metal, but other materials such as composites and resins may be used. The attachment members 17 may also be formed separately and attached by any conventional means such as welding or fastening. As illustrated, the attachment members 17 are substantially "S" shaped, but other shapes such as straight, L-shaped, or arcuate members may be used. The plurality of attachment members 17 as illustrated includes five attachment members 17, but any number of attachment members 17 may be used.

Figure 2:
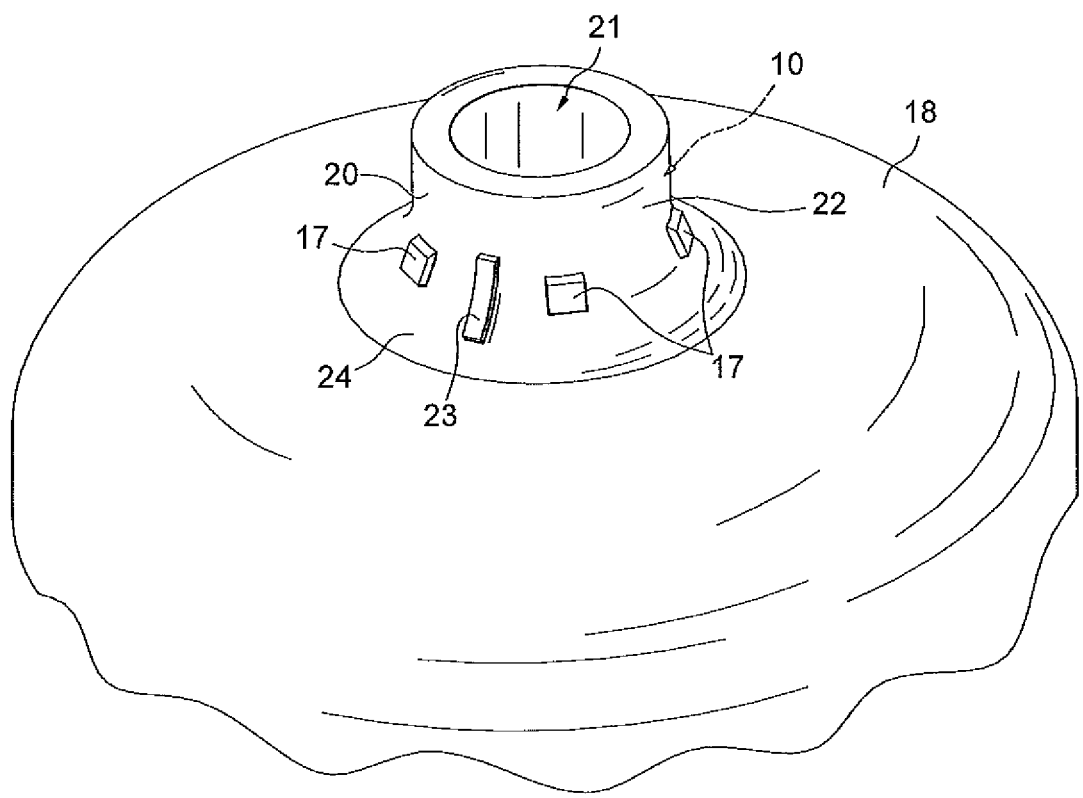
FIG. 2 is a perspective view of a vessel liner including the capture sleeve illustrated in FIG. 1.

FIG. 2 illustrates the capture sleeve 10 disposed within a vessel liner 18. The vessel liner 18 is typically formed from a polymeric material. However, other plastics and non-metallic materials may be used. The vessel liner 18 is substantially "capsule" shaped, including a hollow right circular cylinder as a central portion and two hollow hemispheres disposed at opposing ends thereof. Other shapes of the vessel liner 18 may be used such as a prolate spheroid, other ellipsoids, or any other shape. The vessel liner 18 is formed from one of injection molding, rotational molding, blow molding, stretch injection molding, and thermoforming. Any other process that permits disposal of the capture sleeve 10 within the vessel liner 18 may also be used. The vessel liner 18 includes a hollow neck portion 20 which forms a vessel opening 21. As shown, the hollow neck portion 20 is a hollow right circular cylinder, but other shapes may be used. The hollow neck portion 20 is typically integrally formed with the vessel liner 18. An outer sealing surface 22 forms at least a portion of the hollow neck portion 20. An alignment tab 23 is formed in an outer surface of the vessel liner 18. The alignment tab 23 is rectangular in cross section, but any other shape may be used. Further, the alignment tab 23 may be formed separately from the vessel liner 18 and attached by any conventional means, and is disposed on at least one of the vessel liner 18, the neck portion 20, and a transition portion 24. The transition portion 24 of the vessel liner 18 is provided to enable a substantially smooth or tangential transition from the vessel liner 18 to the neck portion 20.

Figure 3:
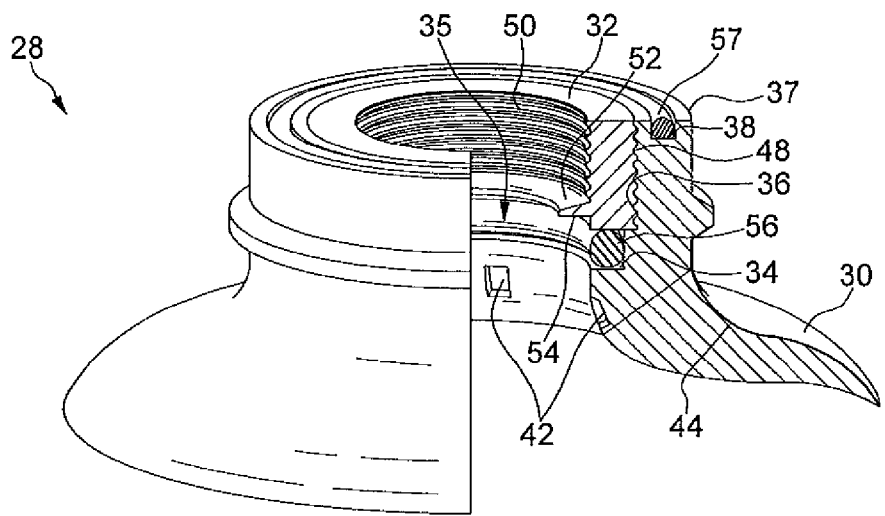
FIG. 3 is a perspective view of a boss according to an embodiment of the present invention, a portion of the boss shown in section.

A boss 28 according to an embodiment of the present invention is illustrated in FIG. 3. The boss 28 provides a means for connecting various fixtures and utility devices to the vessel. The boss 28 includes an engagement portion 30 and an adapter portion 32.

Figure 4:
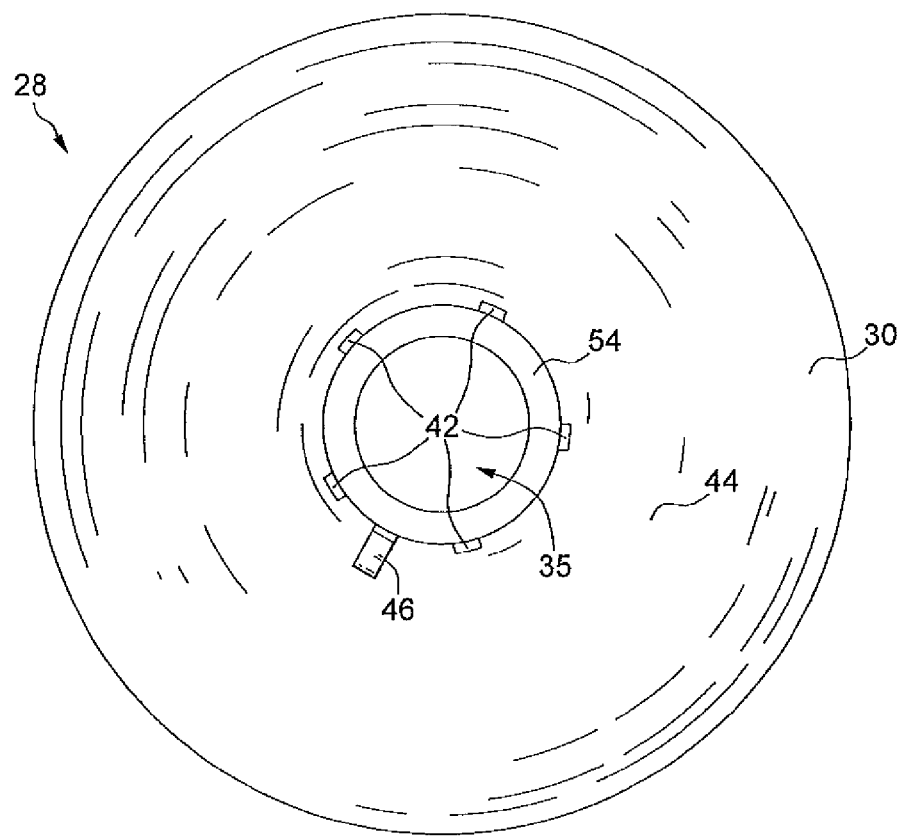
FIG. 4 is a bottom plan view of the boss illustrated in FIG. 3.

The engagement portion 30 of the boss 28 is typically formed from a metal such as aluminum or steel. However, other materials such as plastic, hard rubber, and resin based materials may be used. The engagement portion 30 includes a seal seat 34. The seal seat 34 has at least one surface forming a portion of a central bore 35 of the boss 28. FIG. 3 illustrates the seal seat 34 including two surfaces orthogonally arranged, wherein one of the surfaces is disposed adjacent an upper portion of the central bore 35, the upper portion including a helical boss thread 36 formed thereon. Alternately, the seal seat 34 may be a single surface having a substantially arcuate shape, for example, or other shape as desired. The helical boss thread 36 extends from a boss finish 37 towards the seal seat 34. An auxiliary seal seat 38 is formed in the boss finish 37. The auxiliary seal seat 38 is an annular channel having a substantially rectangular shaped cross-section. Other cross sectional shapes may be used. Alternately, the auxiliary seal seat 38 may be formed on an inner surface or an outer surface of the engagement portion 30. As shown in FIGS. 3 and 4, a plurality of receiving elements 42 is formed in an abutment surface 44 of the engagement portion 30. The receiving elements 42 are apertures substantially corresponding to a shape of a portion of the attachment members 17. The plurality of receiving elements 42, as illustrated, have five receiving elements 42, but any number may be used. An alignment aperture 46 is formed in the abutment surface 44 of the engagement portion 30. The alignment aperture 46 is formed to substantially correspond to a shape of the alignment tab 23 disposed on the vessel liner 18. A single alignment aperture 46 is shown, but any number of alignment apertures 46 may be used.

The adapter portion 32 of the boss 28 is typically formed from a metal such as aluminum or steel. However, other materials such as a plastic, a hard rubber, and a resin based material may be used. The adapter portion 32 is a hollow right circular cylinder. The engagement portion 30 receives the adapter portion 32 therein. The adapter portion 32 includes an exterior helical thread 48 formed on an outer surface thereof. As shown, the exterior helical thread 48 extends along an entire length of the outer surface. However, any other arrangement of the exterior helical thread 48 may be used. An interior helical thread 50 is formed on at least a portion of an inner surface of the adapter portion 32. The interior helical thread 50 provides a means for connecting various fixtures and utility devices (not shown) to the boss 28. FIG. 3 illustrates the interior helical thread 50 formed on the portion of the inner surface adjacent a finish of the adapter portion 32 and extending towards a flange 52. However, any other arrangement of the interior helical thread 50 may be used. Alternately, means other than the helical threads 36, 48, 50 such as a bayonet style coupler may be used to couple the adapter portion 32 to the engagement portion 30. The flange 52 is an annulet having a substantially trapezoidal shaped cross-section extending radially inwardly from the inner surface of the adapter portion 32. However, other shapes such as a rectangular, triangular, or arcuate cross-sections may be used. The flange 52 shown is integrally formed with the adapter portion 32 but the flange 52 may be formed separate and attached by any conventional means. A mating surface 54 of the flange is ring shaped and substantially corresponds to a finish of the hollow neck portion 20. As shown, the mating surface 54 is orthogonal to the inner surface of the adapter portion 32.

Figure 5:
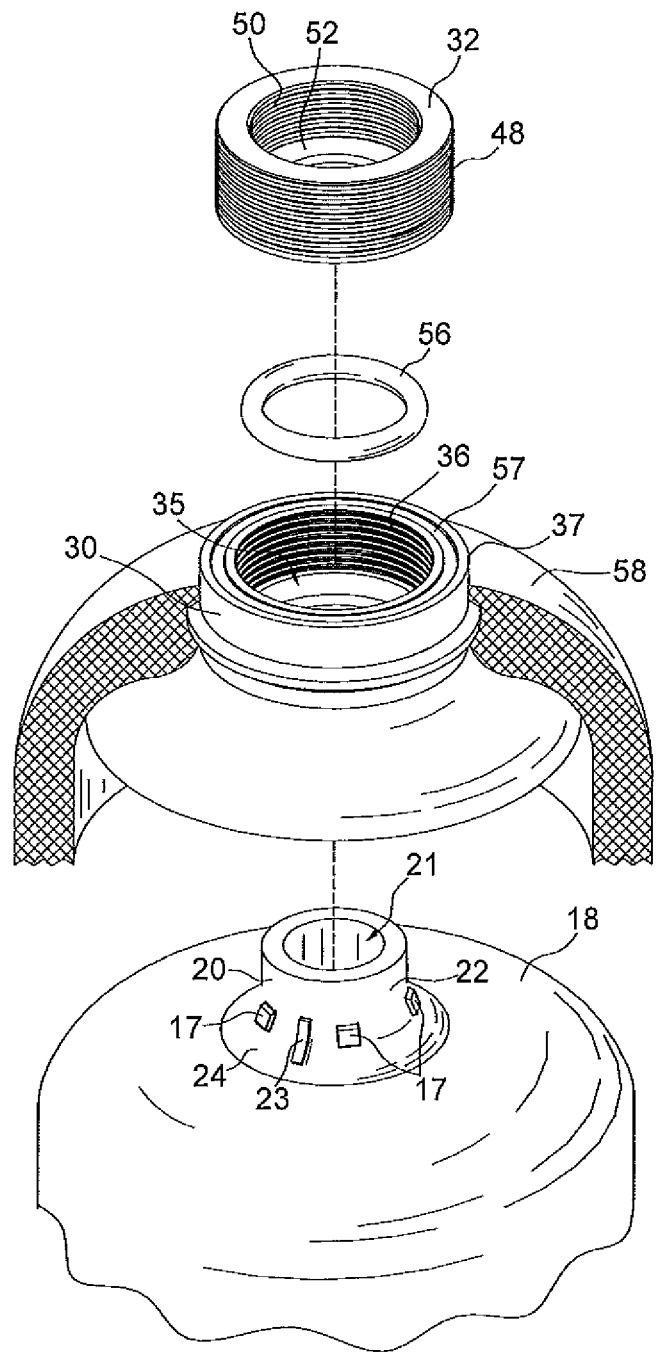
FIG. 5 is an exploded fragmentary perspective view of a pressure vessel including the boss illustrated in FIG. 3, the vessel liner including the capture sleeve illustrated in FIG. 2, and a reinforcement structure shown in section disposed thereon.
Figure 6:
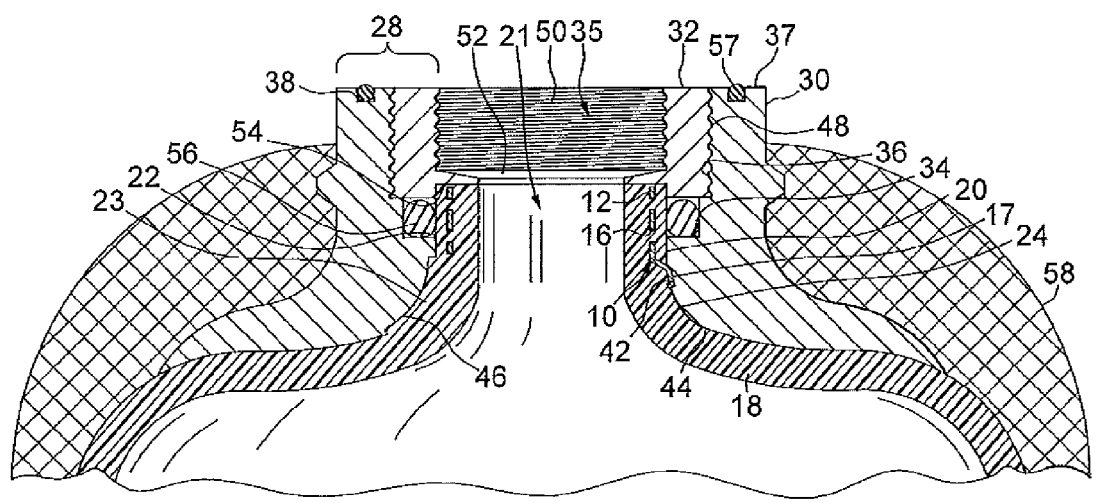
FIG. 6 is a fragmentary cross-sectional view of the pressure vessel illustrated in FIG. 5, the pressure vessel including the reinforcement structure illustrated in FIG. 5 disposed thereon.

As more clearly shown in FIGS. 5 and 6, a sealing element 56 for use with the vessel is provided. The sealing element 56 is an O-ring typically formed from at least one of an elastomer and a plastic. However, other materials having desired characteristics may be used such as a rubber, a metal, and an ultra high molecular weight polyethylene (UHMW-PE), for example. The sealing element 56 formed from an elastomer may be used with embodiments of the boss 28 not including the adaptor portion 32. The sealing element 56 formed from a metal may be used with embodiments of the boss 28 including the adaptor portion 32. Further, an encapsulated O-ring may be used, wherein the encapsulated O-ring includes multiple layers formed from various materials such as fluorinated ethylene propylene, fluoroelastomers (FKM), and methyl-vinyl silicone rubber (VMQ), for example. The sealing element 56 may also be a sealing system, the sealing system including a plurality of components. The seal seat 34 receives the at least one sealing element 56. An auxiliary sealing element 57 for use with the vessel is provided. The auxiliary sealing element 57 is an O-ring typically formed from at least one of an elastomer and a plastic. However, other materials having desired characteristics may be used such as a rubber, a metal, and an ultra high molecular weight polyethylene (UHMW-PE), for example. Further, an encapsulated O-ring may be used, wherein the encapsulated O-ring includes multiple layers formed from various materials such as fluorinated ethylene propylene, fluoroelastomers (FKM), and methyl-vinyl silicone rubber (VMQ), for example. The auxiliary sealing element 57 may also be an auxiliary sealing system, the auxiliary sealing system including a plurality of components. The auxiliary seal seat 38 receives at least one auxiliary sealing element 57. As shown in FIGS. 5 and 6, a reinforcement structure 58 may be disposed on the vessel liner 18. The reinforcement structure 58 is a wound outer shell formed with a filament winding process. The reinforcement structure 58 may be formed from one of a carbon fiber, a glass fiber, a composite fiber, and a fiber having a resin coating. It is understood that the material used to form the reinforcement structure 58 may be selected based on the process used to affix the reinforcement structure 58 to the vessel liner 18 and the use of the vessel.

A vessel assembly is illustrated in FIG. 5. The vessel liner 18 including the capture sleeve 10 is adapted to receive and secure the engagement portion 30 of the boss 28. The hollow main body 12 of the capture sleeve 10 is disposed within the vessel liner 18 during a manufacture of the vessel liner 18. The capture sleeve 10 is disposed in a mold used to form the vessel liner 18 prior to a forming thereof. The vessel liner 18 including the capture sleeve 10 may be formed from an injection molding process, a rotational molding process, a thermoforming process, a blow molding process, a stretch injection molding process, or any combination thereof.

Prior to disposing the engagement portion 30 on the vessel liner 18, the alignment tab 23 is aligned with the alignment aperture 46 and the attachment members 17 are aligned with the receiving elements 42. As shown in FIG. 5, the attachment members 17 extend in a radial outward direction from the vessel liner 18. In certain embodiments of the invention, the capture sleeve 10 is formed from a spring steel and the vessel liner 18 is formed from a resilient plastic, permitting the attachment members 17 and the vessel liner 18 to flex towards the axis of the neck portion 20 when the engagement portion 30 is disposed on the neck portion 20. A temporary elastic deformation of the vessel liner 18 and attachment members 17 permit the attachment members 17 to be received in the receiving elements 42, thereby securing the engagement portion 30 to the vessel liner 18.

The sealing element 56 disposed in the seal seat 34 sealingly engages the engagement portion 30 and the outer sealing surface 22 of the hollow neck portion 20. Accordingly, the sealing element 56 disposed in the seal seat 34 militates against a fluid from exiting the pressure vessel by passing through a juncture formed between the abutment surface 44 and the outer sealing surface 22 of the hollow neck portion 20. The fluid passing through the juncture of the abutment surface 44 and the liner 18 results in loss of the fluid from the pressure vessel and separation of the liner 18 from the boss 28 and the reinforcement structure 58.

The auxiliary sealing element 57 disposed in the auxiliary seal seat 38 sealingly engages one of the various fixtures and utility devices connected to the boss 28. Accordingly, the auxiliary sealing element 57 disposed in the auxiliary seal seat 38 militates against a fluid from exiting the pressure vessel by passing through a juncture formed between the boss finish 37 and one of the various fixtures and utility devices. The fluid passing through the juncture of the boss finish 37 and one of the various fixtures and utility devices results in loss of the fluid from the pressure vessel.

In use, the sealing element 56 exerts a substantially constant force on the hollow neck portion 20. The vessel liner 18 is subject to dimensional changes due to a relatively high coefficient of thermal expansion typical of polymers. The dimensional changes occur due to temperature changes during use of the pressure vessel. By providing a minimal distance between the hollow main body 12 and the outer sealing surface 22 of the hollow neck portion 20, the vessel liner 18 is forced to expand inwardly, towards the axis of the hollow neck portion 20. As a result, an outermost diameter of the hollow neck portion 20 remains substantially constant, permitting a substantially constant sealing force between the sealing element 56 disposed in the seal seat 34 and the outer sealing surface 22. Additionally, by minimizing the distance between the hollow main body 12 and the outer sealing surface 22 of the vessel liner 18, a fatigue and a creep of the liner 18 caused by repeated thermal expansion cycles is militated against.

The engagement portion 30 receives the adapter portion 32 and is secured by engagement of the helical boss thread 36 and the exterior helical thread 48. As more clearly shown in FIG. 6, the mating surface 54 of the flange 52 abuts the finish of the hollow neck portion 20, militating against an outward expansion of the vessel liner 18 during temperature and pressure changes within the vessel liner 18. Further, the flange 52 protects the vessel liner 18 from damage that may occur during one of installation and removal of the various fixtures and utility devices that may be attached to the boss 28.

Figure 7:
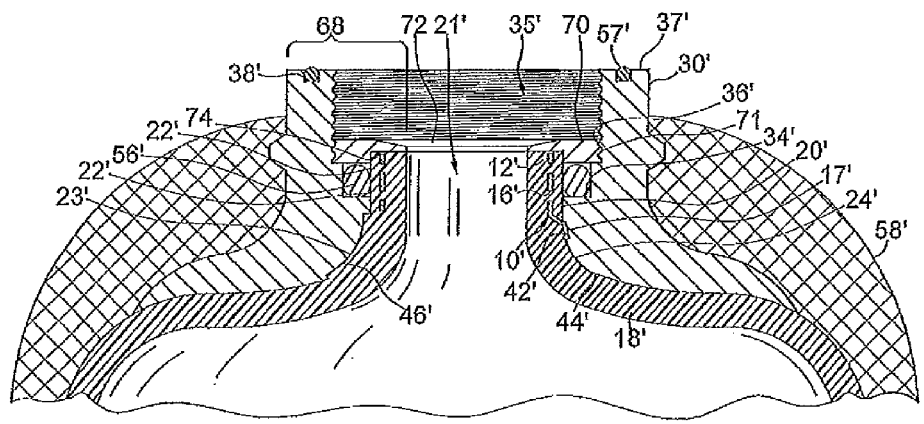
FIG. 7 is a fragmentary cross-sectional view of a pressure vessel according to another embodiment of the invention, the pressure vessel including a boss, a vessel liner including a capture sleeve, and a reinforcement structure disposed thereon.

FIG. 7 shows another embodiment of the invention similar to that shown in FIG. 6. Reference numerals for similar structure in respect of the description of FIG. 6 are repeated in FIG. 7 with a prime (') symbol.

FIG. 7 illustrates the pressure vessel including a boss 68. The boss 68 includes a ring adapter portion 70 and an engagement portion 30'. The ring adapter portion 70 is typically formed from a metal such as aluminum or steel. However, other materials such as a plastic, a hard rubber, and a resin based material, for example, may be used. The ring adapter portion 70 shown is a stepped annulet. The engagement portion 30' receives the ring adapter portion 70 therein. The ring adapter portion 70 includes an exterior helical thread 71 formed on an outer surface thereof. The exterior helical thread 71 engages the helical boss thread 36'. Alternately, means other than the helical threads 36', 71 such as a bayonet style coupler may be used to couple the ring adapter portion 70 to the engagement portion 30'. The ring adapter portion 70 includes a flanged finish 72. The flanged finish 72 is an annulet having a substantially trapezoidal shaped cross-section disposed on an inner surface of the ring adapter portion 70. However, other shapes such as rectangular, triangular, or arcuate cross-sections may be used. A ring mating surface 74 is formed in the ring adapter portion 70. The ring mating surface 74 is ring shaped and substantially corresponds to a finish of a hollow neck portion 20'. The helical boss thread 36' provides a means for connecting various fixtures and utility devices to the boss 68. Accordingly, the ring adapter portion 70 eliminates the need for a second coupling means for connecting various fixtures and utility devices to the boss 68.

Figure 8:
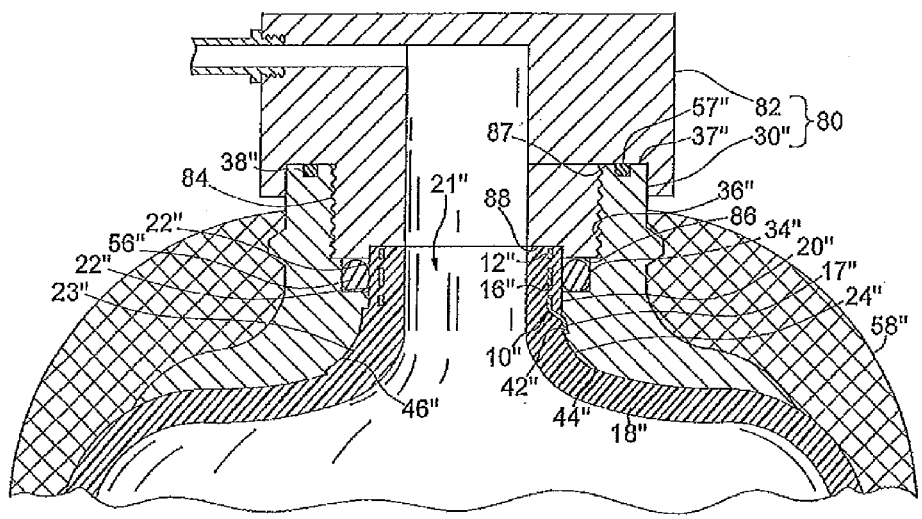
FIG. 8 is a fragmentary cross-sectional view of a pressure vessel according to another embodiment of the invention, the pressure vessel including a boss, a utility device, a vessel liner including a capture sleeve, and a reinforcement structure disposed thereon.

FIG. 8 shows another embodiment of the invention similar to that shown in FIG. 6. Reference numerals for similar structure in respect of the description of FIG. 6 are repeated in FIG. 8 with a double prime (") symbol.

FIG. 8 illustrates the pressure vessel including a boss 80. The boss 80 includes a utility device 82 and an engagement portion 30". The utility device 82 is typically formed from a metal such as aluminum or steel. However, other materials such as a plastic, a hard rubber, and a resin based material, for example, may be used. The utility device 82 is received by the engagement portion 30". The utility device 82 includes a helical utility thread 84 formed on an outer surface thereof. The utility device 82 engages the helical boss thread 36". Alternately, means other than the helical threads 36", 84 such as a bayonet style coupler may be used to couple the utility device 82 to the engagement portion 30". The utility device 82 includes an abutment finish 86 and a sealing surface 87. The sealing surface 87 is a ring shaped surface formed in the utility device 82 that sealingly engages the auxiliary sealing element 57". The abutment finish 86 is a stepped portion of the utility device 82 having a utility mating surface 88. The utility mating surface 88 is ring shaped and substantially corresponds to a finish of a hollow neck portion 20". The helical boss thread 36" provides a means for connecting various fixtures and utility devices to the boss 80. Accordingly, the utility device 82 having the abutment finish 86 eliminates the need for a second coupling means for connecting various fixtures and utility devices to the boss 80.

A rigidity of the neck portion 20, 20', 20" is maximized by the capture sleeve 10, 10', 10". Similarly a resistance to thermal expansion of the neck portion 20, 20', 20" in a radially outward direction is maximized. By minimizing a distance between the hollow main body 12, 12', 12" and the outer sealing surface 22, 22', 22" of the hollow neck portion 20, 20', 20", the rigidity and the resistance to thermal expansion is further maximized. In certain embodiments of the invention, a distance of about 1.0 millimeter or less between the hollow main body 12, 12', 12" and the vessel liner 18, 18', 18" yields desirable results. The rigidity of the hollow neck portion 20, 20', 20" results in the outermost diameter of the hollow neck portion 20, 20', 20" remaining substantially constant through varying operating conditions, permitting a substantially constant sealing force between the sealing element 56, 56', 56" disposed in the seal seat 34, 34', 34" and the outer sealing surface 22, 22', 22". The surface irregularities 16, 16', 16" formed in the capture sleeve 10, 10', 10" may permit the material used to form the vessel liner 18, 18', 18" to extend through the hollow main body 12, 12', 12" during formation of the vessel liner 18, 18', 18". Further, the surface irregularities 16, 16', 16" militate against a separation that may occur between the hollow main body 12, 12', 12" and the vessel liner 18, 18', 18" during repeated expansion and contraction cycles caused by temperature and pressure variations within the vessel.

The capture sleeve 12, 12', 12" the vessel liner 18, 18', 18" and the boss 28, 68, 80 militate against a rotational and an axial movement of the boss 28, 68, 80. The reinforcement structure 58, 58', 58" may be disposed on the vessel liner 18, 18', 18" and the boss 28, 68, 80 using a winding process that requires a rotation of the liner 18, 18', 18" and the boss 28, 68, 80. A machine used to turn the liner 18, 18', 18" during the winding process typically attaches to at least one boss 28, 68, 80 disposed on the liner 18, 18', 18". The machine applies a rotational force to the boss 28, 68, 80 causing the rotation of the boss 28, 68, 80 and liner 18, 18', 18". Since the reinforcement structure 58, 58', 58" is disposed on the boss 28, 68, 80 and the liner 18, 18', 18" during the winding process, the liner 18, 18', 18" exerts a rotational resistance force. The attachment members 17, 17', 17" and the alignment tab 23, 23', 23", both of which are fixed to the liner 18, 18', 18", respectively exert the rotational resistance on the receiving elements 42, 42', 42" and the alignment aperture 46, 46', 46" of the boss 28, 68', 80. Alternately, coupling the boss 28, 68, 80 to the various fixtures and utility devices may apply the rotational force to the boss 28, 68, 80. Accordingly, the attachment members 17, 17', 17" and the alignment tab 23, 23', 23" militate against the rotational movement (around the axis of the neck portion 20, 20', 20") of the boss 28, 68, 80 with respect to the liner 18, 18', 18". During the vessel assembly, the engagement portion 30, 30', 30" is secured to the liner 18, 18', 18" when the attachment members 17, 17', 17" are received in the receiving elements 42, 42', 42". An engagement of the engagement portion 30, 30', 30" with the attachment members 17, 17', 17" results in attachment of the engagement portion 30, 30', 30" to the vessel liner 18, 18', 18". As a result of the attachment of the engagement portion 30, 30', 30", the axial movement (along the axis of the neck portion 20, 20', 20") of the boss 28, 68, 80 is militated against.

The alignment tab 23, 23', 23" and the alignment aperture 46, 46', 46" permit a defined alignment of the vessel liner 18, 18', 18" and the engagement portion 30, 30', 30". The alignment tab 23, 23', 23", the alignment aperture 46, 46', 46", or other indicia disposed on the vessel liner 18, 18', 18" and the engagement portion 30, 30', 30" indicate the proper orientation of the vessel liner 18, 18', 18" and the engagement portion 30, 30', 30" prior to assembly of the pressure vessel, ensuring disposal of the alignment tab 23, 23', 23" in the alignment aperture 46, 46', 46". Accordingly, the defined alignment of the vessel liner 18, 18', 18" and the engagement portion 30, 30', 30" permits assembly of the pressure vessel by automated processes. The defined alignment is advantageous when one of the vessel liner 18, 18', 18" and the engagement portion 30, 30', 30" is asymmetric, ensuring the engagement portion 30, 30', 30" is consistently disposed on the vessel liner 18, 18', 18". Further, the various fixtures and utility devices that may be attached to the boss 28, 68 and the utility device 82 may be disposed consistently, according to a position of one of the engagement portion 30, 30', 30" and the vessel liner 18, 18', 18". In embodiments of the boss 28, 68, 80 not including one of the adaptor portion 32 and the ring adapter portion 70, the defined alignment affords consistent positioning of the helical threads 50, 36', 36" or other coupling means disposed in the central bore 35, 35'. The alignment tab 23, 23', 23" and the alignment aperture 46, 46', 46" afford consistent assembly and coupling of the vessel liner 18, 18', 18", the engagement portion 30, 30', 30", and any other componentry associated with the pressure vessel.

The boss 28, 68, 80 and the capture sleeve 10, 10', 10" according to the present invention provide for the sealing element 56, 56', 56" to be installed and replaced with ease. Upon disposal of the engagement portion 30, 30', 30" on the liner 18, 18', 18", the sealing element 56, 56', 56" is disposed around the hollow neck portion 20, 20', 20". The sealing element 56, 56', 56" is then disposed against the seal seat 34, 34', 34" and the outer sealing surface 22, 22', 22" of the hollow neck portion 20, 20', 20" using one of a tool and a press. One of the adaptor portion 32, the ring adapter portion 70, and the utility device 82 is then fitted in the engagement portion 30, 30', 30", completing the vessel assembly. The sealing elements 56, 56', 56" and 57, 57', 57" may need to be replaced as a result of repeated use and an aging of the pressure vessel. Several steps may be required to replace the sealing element 56, 56', 56". First, the pressure vessel is emptied and the fixture or utility device coupled to the boss 28, 68, 80 is removed. One of the adaptor portion 32, the ring adaptor portion 70, and the utility device 82 is removed from the engagement portion 30, 30', 30", exposing the sealing element 56, 56', 56". The sealing element 56, 56', 56" is then replaced. One of the adaptor portion 32, the ring adaptor portion 70, and the utility device 82 is replaced, and the pressure vessel may be used again. The sealing element 57, 57', 57" may be similarly replaced by removing the utility device 82 or other fixture from one of the adapter portion 32 and the engagement portion 30', 30".

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A boss system for a vessel, the system comprising:
a sleeve configured to be substantially embedded within at least a portion of a liner of the vessel, the sleeve provided with a plurality of attachment members, wherein at least a portion of at least one of the attachment members of the sleeve is configured to protrude from a surface of the liner of the vessel; and
a boss cooperating with the attachment members of the sleeve including the at least one of the attachment members of the sleeve configured to protrude from the surface of the liner of the vessel to couple the boss to the sleeve.

2. The boss system according to claim 1, wherein the boss includes a channel for receiving at least one sealing element.

3. The boss system according to claim 1, further comprising a sealing element configured to exert a substantially constant force on the liner of the vessel.

4. The boss system according to claim 2, wherein the boss includes an adapter portion that forms a portion of the channel, the adapter portion releasably attached to an engagement portion.

5. The boss system according to claim 4, wherein each of the adapter portion and the engagement portion includes a thread for coupling the adapter portion to the engagement portion.

6. The boss system according to claim 4, wherein the adapter portion includes a flange for abutting the liner of the vessel.

7. The boss system according to claim 1, wherein the boss receives a utility device.

8. The boss system according to claim 1, wherein the sleeve includes a hollow main body having at least one surface irregularity formed therein, 9. The boss system according to claim 1, wherein the sleeve is formed from at least one of a steel alloy, high carbon steel, stainless steel, nickel alloy, aluminum, plastic, and composite material.

10. The boss system according to claim 1, further including a reinforcement structure disposed on the boss.

11. The boss system according to claim 1, wherein the boss includes a plurality of receiving elements formed thereon.

12. The boss system according to claim 11, wherein the receiving elements cooperate with the attachment members to militate against at least one of a relative axial movement and a relative radial movement between the boss and the sleeve.

13. A vessel for storing a fluid, the vessel comprising:
a vessel liner having a vessel opening formed therein; and
a sleeve substantially embedded within at least a portion of the vessel liner adjacent the vessel opening, the sleeve provided with a plurality of attachment members cooperating with a boss of the vessel, wherein at least a portion of the attachment members protrudes from a surface of the vessel liner.

14. The vessel according to claim 13, wherein the boss is disposed adjacent the sleeve, the boss including an adapter portion releasably attached to an engagement portion.

15. The vessel according to claim 14, wherein the vessel liner includes at least one alignment tab for engaging an alignment channel formed in the engagement portion of the boss.

16. The vessel according to claim 14, wherein the adapter portion of the boss is a utility device.

17. The vessel according to claim 14, further including a reinforcement structure disposed on the vessel liner and the boss.

18. The vessel according to claim 14, wherein the engagement portion of the boss includes a plurality of receiving elements, wherein each of the receiving elements of the boss cooperates with a corresponding one of the attachment members of the sleeve to militate against relative movement between the boss and the sleeve.

19. A method for forming a vessel, the method comprising the steps of:
- providing a sleeve with a plurality of attachment members configured to cooperate with a boss of the vessel; and
- forming a vessel liner to substantially embed the sleeve within at least a portion thereof, wherein at least a portion of at least one of the attachment members of the sleeve protrudes from a surface of the vessel liner.

* * * * *